United States Patent [19]
King, Jr.

[11] 3,793,546
[45] Feb. 19, 1974

[54] ROTOR FOR DYNAMOELECTRIC MACHINES

[75] Inventor: Edward I. King, Jr., Monroeville, Pa.

[73] Assignee: Westinghouse Electric Corporation, Pittsburgh, Pa.

[22] Filed: Feb. 5, 1973

[21] Appl. No.: 329,916

Related U.S. Application Data

[63] Continuation of Ser. No. 176,596, Aug. 31, 1971, abandoned.

[52] U.S. Cl................................ 310/183, 310/211
[51] Int. Cl.............................................. H02k 3/18
[58] Field of Search... 310/183, 197, 211, 261, 264, 310/269, 270

[56] References Cited
UNITED STATES PATENTS

| | | | |
|---|---|---|---|
| 1,489,002 | 4/1924 | Parsons et al...................... | 310/183 |
| 1,695,391 | 12/1928 | Schov.................................. | 310/183 |
| 1,755,283 | 4/1930 | Adams................................ | 310/211 |
| 2,683,230 | 7/1954 | Mickelson......................... | 310/183 X |
| 2,691,113 | 10/1954 | Ordas.............................. | 310/183 X |

Primary Examiner—J. D. Miller
Assistant Examiner—Mark O. Budd
Attorney, Agent, or Firm—G. H. Telfer

[57] ABSTRACT

A synchronous dynamoelectric machine having a salient pole rotor with a damper winding including bars of magnetic material such as steel. In order to minimize losses and heating in the stator winding end regions due to radial leakage flux, the end portions of the damper bars and the short-circuiting end rings, and preferably also the pole end plates, are made of non-magnetic material.

7 Claims, 4 Drawing Figures

ROTOR FOR DYNAMOELECTRIC MACHINES

This is a continuation, of application Ser. No. 176,596 filed Aug. 31, 1971 now abandoned.

BACKGROUND OF THE INVENTION

The present invention relates to synchronous dynamoelectric machines having salient pole rotors, such as water-wheel generators and large synchronous motors, for example.

The rotors of such machines are always provided with damper windings consisting of bars placed in slots in the pole faces and short-circuiting end rings connecting the bars to form a squirrel cage winding. In many cases, the damper bars are made of steel, or other magnetic material, which greatly improves the starting torque of the machine as a synchronous motor and contributes additional magnetic material to the poles to improve the running performance either as a motor or as a generator. The bars extend axially of the machine for the full length of the pole members and beyond the poles, so that the bar end portions and the short-circuiting end rings which connect them extend out beyond the poles and the stator core into the region under the end turn portions of the stator winding. The presence of this magnetic material in the end region of the machine has the effect of amplifying the magnetic flux present in this region which links the stator winding. Relatively high losses and objectionable heating are often caused in the stator winding, therefore, because of the presence of this magnetic material although the use of magnetic damper bars is highly desirable for the reasons indicated above.

SUMMARY OF THE INVENTION

In accordance with the present invention, a synchronous dynamoelectric machine having a salient pole rotor is provided with a damper winding which has magnetic bars in pole face slots to obtain the increased motor starting torque and other advantages referred to above. The magnetic material previously present in the end regions of such machines, however, is eliminated and the end portions of the damper bars and the end rings, and preferably also the pole end plates, are made of non-magnetic material. This can be done by making the central portions of the damper bars which lie in the pole face slots of magnetic steel with the end portions of the bars which extend beyond the poles made of non-magnetic material, such as stainless steel, welded or otherwise joined to the central portions of the bars. Stainless steel end rings are joined to the ends of the bars to complete the damper winding. The removal of magnetic material from the end regions of the machine results in a large decrease in the radial flux density in the end regions, with a corresponding reduction in the losses and heating in the stator windings as compared to conventional constructions with magnetic damper windings extending into the end regions.

DESCRIPTION OF DRAWINGS

The invention will be more fully understood from the following detailed description of an illustrative embodiment, taken in connection with the accompanying drawings, in which.

DESCRIPTION OF A PREFERRED EMBODIMENT

Figure 1:
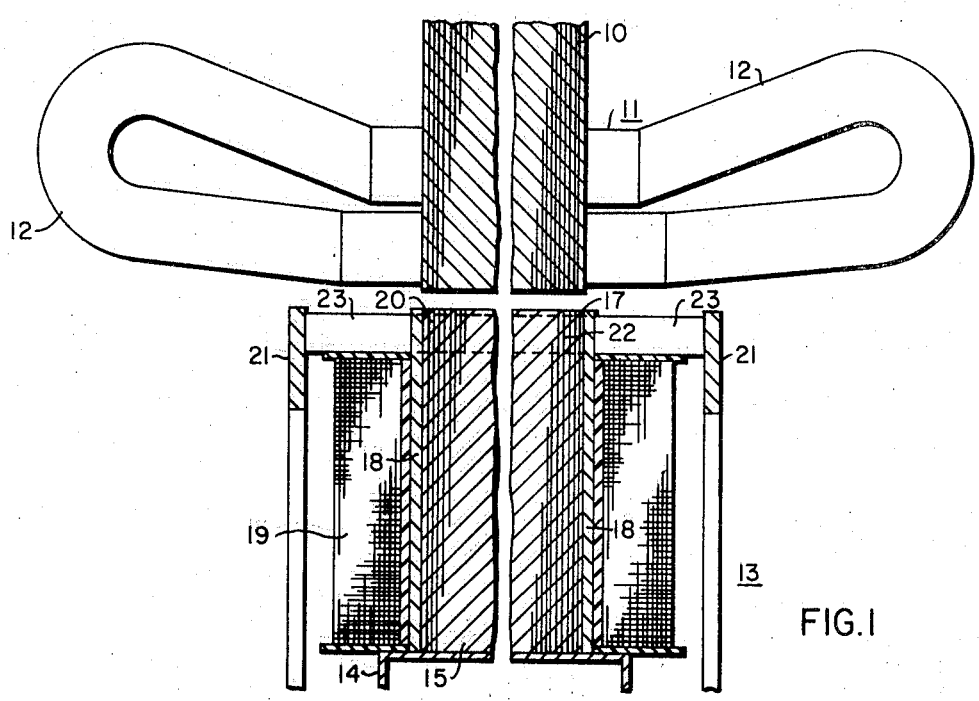
FIG. 1 is a longitudinal sectional view of the stator and rotor members of a dynamoelectric machine embodying the invention.

As previously indicated, the invention is particularly applicable to relatively large synchronous dynamoelectric machines with salient pole rotors. The invention is shown in the drawings applied to such a machine, the stator and rotor members of the machine being somewhat diagrammatically shown in FIG. 1. As there illustrated, the machine has a stator core 10 of the usual laminated construction with a stator winding 11 of any suitable type disposed in slots in the core 10 and having end turn portions 12 extending beyond the core at each end of the machine. It will be understood that the stator of the machine may be of any desired type and it has not been shown in detail as the particular construction of the stator is not a part of the invention.

The machine also has a rotor member 13 having a plurality of salient poles which may be of the usual construction, or of any desired construction, and which are carried on a rotating member which is shown somewhat diagrammatically as a spider member 14 adapted to be mounted on a shaft (not shown). The poles may of course be supported directly on the shaft itself, or they may be mounted for rotation in any desired manner. Each of the pole members has a body 15 which may be of the usual laminated construction and which includes a pole head 16 having a pole face 17 which forms an air gap with the stator core 10. The pole member 15 preferably also has end plates 18 at each end which may be utilized to clamp the laminated body portions 15. A field coil 19 is placed on the pole body 15 and, in combination with similar coils on the other poles, forms the field winding of the machine which produces the main air gap flux. The pole 15 is also provided with a damper winding consisting of a plurality of conducting damper bars 20 which are placed in slots in the pole face 17. As shown, the slots are closed slots and the bars 20 extend axially outward from the slots at each end of the pole 15. The damper winding is completed by short-circuiting end rings 21 at each end which extend circumferentially around the rotor and connect all the damper bars 20 to form a squirrel cage damper winding.

It will be seen that the damper winding, including the bars and end rings, extends out beyond the poles at each end into the end regions of the machine under the end turn portions 12 of the stator winding. This region of the machine is, of course, outside the main magnetic flux path through the pole bodies 15 and stator core 10 but there is a substantial leakage flux in this region. The actual flux pattern in the end region is a complicated three-dimensional magnetic field which results from the effects of the armature and field current systems acting on the permeabilities of the end region space. Although it is not necessary for present purposes to exactly delineate the magnetic flux pattern, it will be apparent that there is a relatively large amount of magnetic flux in the end region with a substantial radial component which links the stator winding end turns 12. In the usual construction of these machines with magnetic damper windings, the magnetic material of the damper winding which is present in the end region has the effect of materially amplifying the magnetic flux in the end region and produces very high radial flux densities, especially in the region near the stator core. These high flux densities result in correspondingly high eddy current losses in the copper conductors of the stator winding, which are undesirable and which cause excessive heating particularly in the portions of the winding close to the end of the core.

Figure 2:
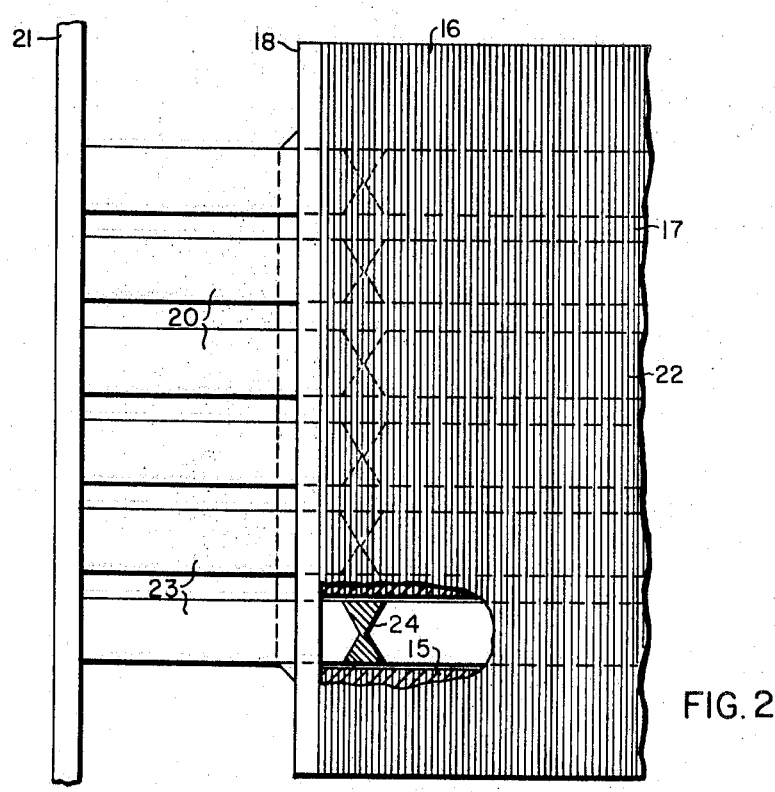
FIG. 2 is a top plan view of one end of a pole member and damper winding.

In accordance with the present invention, these undesirable losses are eliminated by removing the magnetic material from the end regions of the machine while at the same time retaining the desirable magnetic damper bars in the active portions of the pole faces which form the air gap. As shown more particularly in FIG. 2, each of the damper bars 20 has a central portion 22 disposed in the pole face slots and extending from one end to the other of the pole face. Each bar also has two end portions 23 disposed at opposite ends of the central portion 22. The central portion 22 of each damper bar is joined at each end to one of the end portions 23 in any suitable manner which will provide a strong and reliable joint of good electrical conductivity. As shown in FIG. 2, both ends of the central portion 22 are beveled and one end of each of the end portions 23 is correspondingly beveled. These adjacent beveled ends are welded, as indicated at 24, to form a strong joint providing in effect a single damper bar 20 with a central portion 22 and end portions 23. In accordance with the present invention, the central portion 22 of each damper bar is made of magnetic material, such as ordinary steel, in order to obtain the known advantages of such damper bars. The end portions 23, however, are made of non-magnetic material, preferably stainless steel, which can readily be welded to the steel central portions 22. The end rings 21 are also made of non-magnetic material, preferably stainless steel, and are welded or otherwise solidly joined to the end portions 23 of the damper bars. Preferably the end plates 18 at each end of the pole body 15 are also made of stainless steel or other non-magnetic material.

Figure 3:
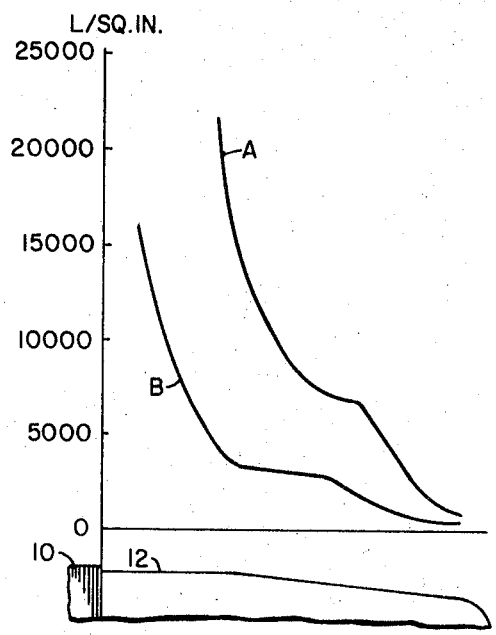
FIGS. 3 and 4 are curves illustrating the effectiveness of the invention.
Figure 4:
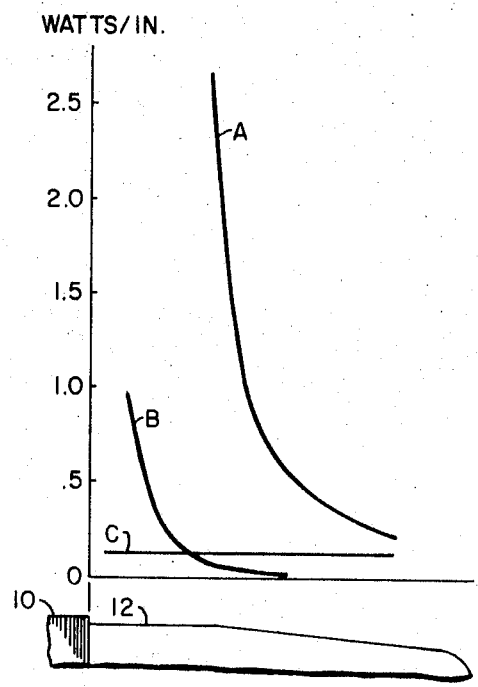

It will be seen that in this construction all magnetic material is removed from the end regions of the machine. A complete damper winding is provided, however, and the bars in the active pole face portions of the machine are of magnetic material so that the advantages of magnetic damper bars are retained. The elimination of magnetic material from the end regions, however, provides a very great improvement in the losses and heating in the end turns of the machine. This is illustrated in FIGS. 3 and 4 which show curves derived from actual tests made on a large salient pole machine designed to operate either as a generator driven by a hydraulic turbine or as a synchronous motor driving the turbine as a pump. In each figure the curve A represents the conditions with a conventional damper winding made entirely of magnetic material and the curve B represents the conditions after this winding had been replaced by a damper winding in accordance with the present invention with no magnetic material in the end regions. In FIG. 3 the radial flux densities in the end region at one end of the machine are shown plotted in their relative positions with respect to the stator winding end portion 12 indicated diagrammatically at the lower part of the figure. FIG. 4 similarly shows the losses calculated from the curves of FIG. 3 and plotted in watts per inch of the stator end winding. FIG. 4 also shows for reference a curve C representing the nominal loss that would result from a direct current in the stator winding equal to the rated full load alternating current of the machine. Figs. 3 and 4 clearly show the dramatic reduction in radial flux density in the end regions and the corresponding reduction in losses and resulting heating due to the removal of magnetic material from the end regions.

A particular embodiment of the invention has been shown and described for the purpose of illustration but it will be apparent that various modifications and other embodiments are possible. Thus any suitable magnetic material may be used for the central portions of the damper bars and any desired non-magnetic material of sufficient electrical conductivity may be used for the end portions of the bars and the end rings. The materials must be such, however, that they can be joined with reliable joints of good electrical conductivity. In the particular embodiment shown the joints are welded but it will be understood that any other desired means of joining the central and end portions of the bars may be utilized.

I claim:

1. A dynamoelectric machine having a stator member and a rotor member, said stator member having a magnetic core and a stator winding disposed in slots in the core, said winding having end turn portions extending beyond the core, said rotor member including a plurality of salient pole members having pole faces, a damper winding on the rotor member, said damper winding including damper bars in said pole faces and end portions extending beyond the pole members under said stator winding end turn portions, the central portion of said damper bars in the pole faces being solid bars made solely of magnetic material and the end portions of the damper winding comprising solid members made solely of non-magnetic material.

2. A dynamoelectric machine as defined in claim 1 in which said end portions of the damper winding include end extensions of the damper bars and short-circuiting end rings connecting the damper bars.

3. A dynamoelectric machine as defined in claim 1 and including non-magnetic end plates at each end of the pole members.

4. A dynamoelectric machine as defined in claim 1 in which the central portion of each of said damper bars in the pole faces is made of magnetic steel and the end portions of the damper winding are made of stainless steel.

5. A rotor member for a dynamoelectric machine comprising a rotatable member, a plurality of salient pole members on said member, each of said pole members having a body portion and a pole face portion, a plurality of damper bars disposed in slots in said pole face portion, each of said damper bars having a central portion and having end portions extending beyond the pole members, and short-circuiting end rings connecting the end portions of all the damper bars, the central portions of the damper bars being solid bars made solely of magnetic material and the end portions of the damper bars and the end rings being solid members made solely of non-magnetic material.

6. A rotor member as defined in claim 5 in which each pole member includes non-magnetic end plates at each end thereof.

7. A rotor member as defined in claim 5 in which the central portions of the damper bars are made of magnetic steel and the end portions of the damper bars and the end rings are made of stainless steel.

* * * * *